United States Patent [19]
Miura

[11] Patent Number: 5,364,485
[45] Date of Patent: Nov. 15, 1994

[54] METHOD OF MANUFACTURING LAMINATE FOR HONEYCOMB STRUCTURE

[75] Inventor: Noriyasu Miura, Tomakomai, Japan

[73] Assignee: Oji Kenzai Kogyo Co., Ltd., Hokkaido, Japan

[21] Appl. No.: 930,689

[22] PCT Filed: Feb. 6, 1991

[86] PCT No.: PCT/JP91/00142
  § 371 Date: Oct. 6, 1992
  § 102(e) Date: Oct. 6, 1992

[87] PCT Pub. No.: WO92/13705
  PCT Pub. Date: Aug. 20, 1992

[51] Int. Cl.$^5$ .................... B31D 3/02; B32B 31/00
[52] U.S. Cl. ...................... 156/264; 156/269; 156/291; 156/512
[58] Field of Search ............... 156/197, 264, 290, 510, 156/511, 526, 548, 543, 549, 269, 291, 516, 512; 83/94, 96, 153, 215, 272, 649, 650; 270/30, 31; 226/4, 8, 110, 124

[56] References Cited

U.S. PATENT DOCUMENTS

| | | | |
|---|---|---|---|
| 2,848,132 | 8/1958 | Davous | 156/197 |
| 3,971,691 | 7/1976 | Cairns | 156/497 |
| 5,277,732 | 1/1994 | Meier | 156/197 |

FOREIGN PATENT DOCUMENTS

| | | |
|---|---|---|
| 0335127 | 4/1989 | European Pat. Off. |
| 1182857 | 9/1957 | France |
| 372031 | 3/1923 | Germany |
| 6-6841 | 8/1931 | Japan |
| 60-15747 | 1/1985 | Japan |
| 60-255422 | 12/1985 | Japan |
| 2-18035 | 1/1990 | Japan |
| 717072 | 5/1952 | United Kingdom |

*Primary Examiner*—Michael Ball
*Assistant Examiner*—Richard Crispino
*Attorney, Agent, or Firm*—Oliff & Berridge

[57] ABSTRACT

A method of manufacturing a laminate for a honeycomb structure has the following steps. The surface of a first sheet already drawn on a flat surface of a trestle and cut in a predetermined length is coated with a plurality of stripes of adhesive having a predetermined interval laterally of the first sheet. A second sheet is drawn from a first supply roll installed longitudinally at one side of the trestle to stack the second sheet onto the first sheet coated with adhesive. The second sheet is pressed, and cut in a predetermined length. The surface of the second sheet is coated with a plurality of stripes of adhesive having a predetermined interval laterally of the second sheet as deviated at its pitch from the plurality of stripes of adhesive longitudinally of the second sheet. A third sheet is drawn from a second supply roll installed at an opposite side of the trestle from the first supply roll to stack it on the second sheet coated with the adhesive. The third sheet is pressed, and cut in a predetermined length. The steps are sequentially repeated.

5 Claims, 9 Drawing Sheets

METHOD OF MANUFACTURING LAMINATE FOR HONEYCOMB STRUCTURE

BACKGROUND OF THE INVENTION

This invention relates to a method of manufacturing a laminate for a honeycomb structure, capable of simply and accurately fabricating a structure in which a honeycomb core is not deformed, and not deviated.

In conventional methods of manufacturing a laminate for a honeycomb structure, a plurality of sheets on which stripes of adhesive are coated and sheets on which no adhesive are coated are alternately wound on a spool by deviating the front and rear surfaces of the sheets at pitches by rewinding a take-up roll (as disclosed in Japanese Patent Laid-open No. Sho 60-15747).

There has also been proposed another method of manufacturing a laminate for a honeycomb structure, in which sheets coated with adhesive on the front and rear surfaces are alternately stacked while being folded in opposite directions and adhered on the front and rear surfaces to each other (as disclosed in Japanese Patent Publication No. Sho 31-6841).

In the above-described conventional methods, the sheets are coated with the adhesive after the sheets are laminated. Additionally, the adhesive is applied by a fixed adhesive coating apparatus.

However, according to these methods, even if the adhesive coating apparatus is fixed, the sheets in a zigzag manner after the sheets are coated with the adhesive and thus deviating the positions of honeycomb cells. Since the sheets were first laminated while winding or folding the sheets on a drum or a spool, it is a disadvantage that the honeycomb cells were deviated due to the deviations of the sheets at the time of winding or folding the sheets.

Since the sheets were coated with the adhesive according to a letter press system, it was difficult to coat the sheets with the adhesive of a constant amount in a predetermined width even under the same conditions due to the material of the sheets and the types or viscosity of the adhesive, and hence the structure of the honeycomb cells have been erroneously manufactured.

According to the conventional method, since the adhesive before curing was soft, the sheets were deviated therebetween at the time of compression.

The minimum width of coating the adhesive is about 2 mm in the conventional adhesive coating mechanism, and the minimum pitch width of coating the sheets with the adhesive is more or less about 7 mm. Therefore, the minimum limit of the structure of the honeycomb cells is about 3 mm, thus making it difficult to manufacture fine honeycomb cells.

SUMMARY OF THE INVENTION

It is an object of this invention to provide a method of manufacturing a laminate for a honeycomb structure which improves upon the conventional methods and can simply and accurately manufacture honeycomb cells of various types from fine to large sizes always with constant honeycomb cells.

According to one aspect of this invention, there is provided a method of manufacturing a laminate for a honeycomb structure comprising the steps of: (a) coating a surface of a first sheet with a plurality of stripes of adhesive (15) having a predetermined interval laterally of said first sheet, said first sheet being already drawn on a flat surface of a trestle (1) and cut in a predetermined length; (b) drawing a second sheet from a second supply roll installed at one longitudinal side of said trestle to stack the second sheet on the first sheet coated with adhesive (15) in the step (a); (c) pressing the second sheet (B); (d) cutting the second sheet in a predetermined length; (e) longitudinally coating a surface of the second sheet with a plurality stripes of adhesive (16) having a predetermined interval laterally of said second sheet as deviated at its pitch from said plurality of stripes of said adhesive (15); (f) drawing a third sheet from a first supply roll installed at an opposite side of said second supply roll to stack it on the second sheet coated with the adhesive; (g) pressing the third sheet onto the second sheet; (h) cutting the third sheet in a predetermined length; and (i) sequentially repeating the steps (a) to (h).

According to another aspect of this invention, there is also provided a method of manufacturing a laminate for a honeycomb structure comprising the steps of: initially providing a first sheet on a flat surface of trestle, the first sheet cut in a predetermined length (a) drawing a second sheet from a second supply roll installed longitudinally at one side of a trestle (1); (b) longitudinally coating a rear surface of said second sheet with a plurality of stripes of adhesive (15) having a predetermined interval laterally of second sheet; (c) stacking the second sheet coated with the adhesive on the first sheet drawn on a flat surface of said first trestle and cut in a predetermined length; (d) pressing said second sheet coated with the adhesive onto the second sheet (A); (e) cutting the second sheet in a predetermined length; (f) drawing third sheet from a first supply roll installed at an opposite side of said trestle from the second supply roll, (g) longitudinally coating a rear surface of said third sheet with a plurality of stripes of adhesive (16) having a predetermined interval laterally of said third sheet as deviated at a pitch from said plurality of stripes of adhesive (15); (h) stacking the third sheet with the adhesive on the surface of said second sheet ; (i) pressing the third sheet coated with the adhesive onto the second sheet; (j) cutting the third sheet in a predetermined length; and (k) sequentially repeating the steps (a) to (j).

This invention is constructed as described above, the take-up rolls are installed at both sides of the trestle having the flat surface, the sheets are alternately drawn from the take-up rolls of both sides, a plurality of stripes of the adhesive to be coated on the surface of the sheets of the same side is always coated in the same manner (thickness, width and pitch of the adhesive are the same at the same position), and a plurality of stripes of the adhesive on the opposite side of the sheet are deviated at its pitch, and sequentially laminated thereon.

That is, according to this invention, the sheets to be treated are placed and fixed on the trestle, the coating with the adhesive and the press of the sheets are conducted by moving the adhesive coating units and the pressing member.

Therefore, according to this invention, the deviation of the adhesive occurring upon zigzag movement of the sheet in the case of laminating the sheets coated with the adhesive in the prior art can be eliminated, and the sheets can be accurately coated with the adhesive. Further, according to this invention, since the laminated sheet can be simply mechanically pressed, the sheets are not deviated therebetween at the time of pressing, and the honeycomb cells can be accurately formed simply.

DESCRIPTION OF THE PREFERRED EMBODIMENTS

Figure 1:
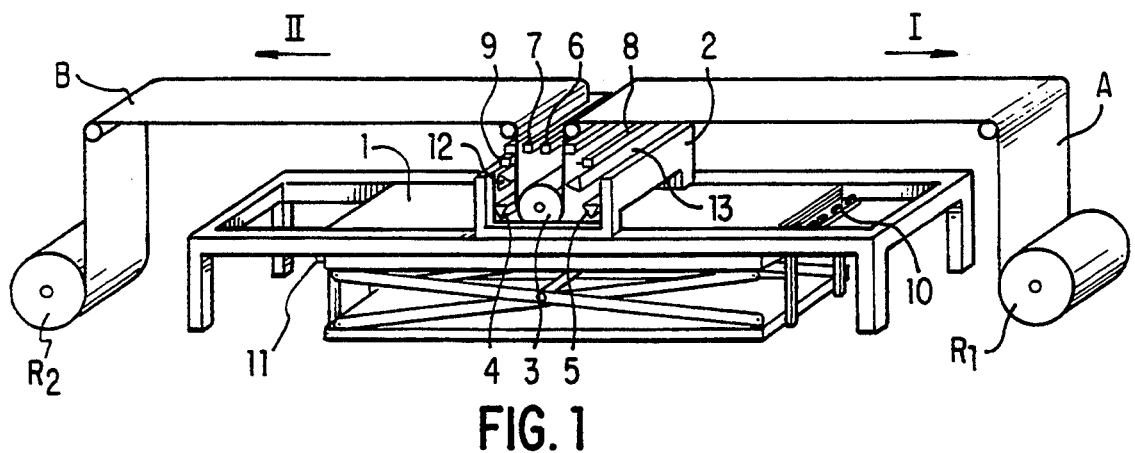
FIG. 1 is a schematic explanatory view of an apparatus for carrying out an invention of this invention.

FIG. 1 is a schematic view of an example of an apparatus used for carrying out this invention. This invention will now be described based on the example in FIG. 1. A frame 2 which reciprocates longitudinally is mounted on a trestle 1 having a flat surface. Take-up or supply rolls $R_1$ and $R_2$ (hereinafter "take-up rolls") are placed at both sides longitudinally of the trestle 1 on the flat surface of the trestle 1. Sheets A and B drawn from the take-up rolls $R_1$ and $R_2$ are placed longitudinally of the trestle 1 on the flat surface the trestle 1.

A pressing roll 3 is mounted at the center of the frame 2. Adhesive coating units 4 and 5, and sheet stoppers 6 and 7 are mounted at both sides of the pressing roll 3.

The adhesive coating units 4 and 5 coat the sheet with a plurality of stripes of adhesive longitudinally of the sheet at a predetermined interval in the lateral direction of the sheet. Although not shown in FIG. 1, a plurality of slits are formed laterally of the sheet at a shim of a coating head in the adhesive coating unit, thereby coating the sheet with the adhesive through the slits. The slits of the adhesive coating unit 4 are deviated at ½ of its pitch from the slits of the other adhesive coating unit 5. As described above, the frame 2 is reciprocated longitudinally on the trestle 1, and the adhesive coating units 4 and 5 are mounted at the frame 2. Therefore, the sheets can be coated with a plurality of stripes of adhesive longitudinally of the sheet at a predetermined interval in the lateral direction of the sheet by the adhesive coating units 4 and 5.

Sheet clippers 10 and 11 are mounted at both longitudinal ends of the trestle 1. Sheet clipper 10 is used with sheet B and sheet clipper 11 is used with A. The sheet clippers 10 and 11 grasp the ends of the respective sheet at both longitudinal ends of the trestle 1. The sheet clippers 10 and 11 move vertically upward or downward to draw the ends of the respective sheets from the take-up rolls.

In the illustrated apparatus, the trestle 1 may have a vertical moving mechanism such as a pantograph, a sensor (not shown) for pressure to be applied by the roll 3 and a control mechanism (not shown) for vertically moving upward or downward the trestle 1 so as to hold a predetermined pressure. The trestle 1 may also have a compression spring (not shown) for holding a predetermined pressure at a bearing of the roll 3, a sensor (not shown) for sensing that the thickness of a laminate is constant, and an elevation mechanism for holding the trestle height constant based on the signal from the sensor. With these mechanism, the clamping force of the sheet by the pressing roll 3 can be held constant irrespective of the variations in the laminate thickness.

Figure 4:
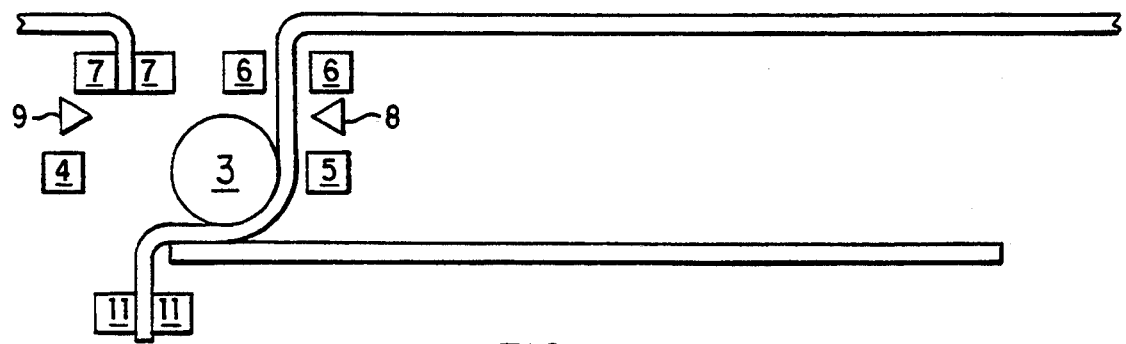
FIGS. 4–11 show the movement of the frame across the trestle during operation of a first embodiment.
Figure 5:
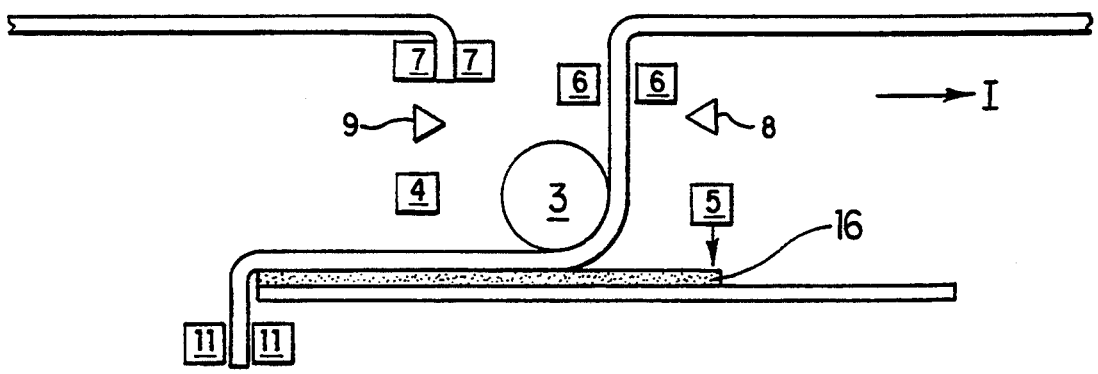
Figure 6:
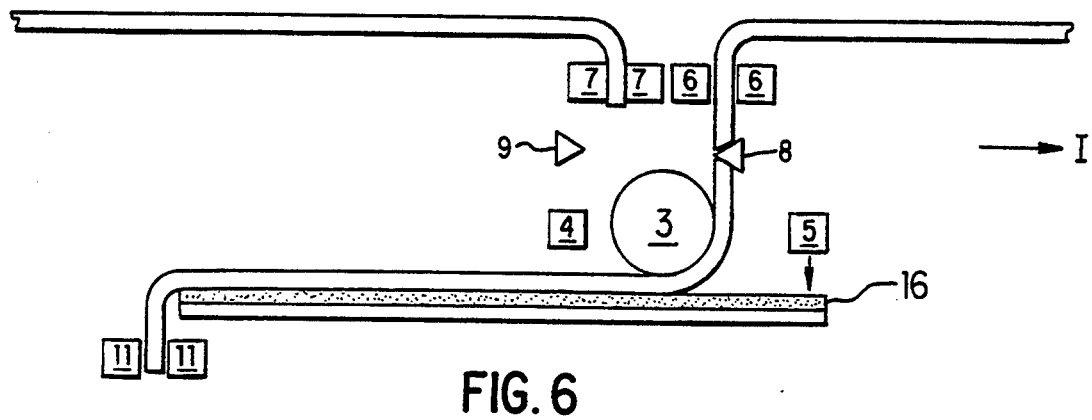

In FIG. 1, with the apparatus constructed as described above, the sheet B is first drawn from the take-up roll $R_2$, placed on the flat surface of the trestle 1, and cut in a predetermined length. This is shown in FIG. 4. As shown in FIG. 5, When the frame 2 is moved in a direction of an arrow I on the trestle 1, the adhesive coating unit 5 coats the surface of the sheet B with a plurality of stripes of adhesive. As described below, the sheet A is stacked on the sheet B, and the sheet A is compressed by the pressing roll 3.

When the frame 2 is moved in the direction of arrow I, the end of the sheet B of the take-up roll $R_2$ is grasped by the sheet stopper 7 at the rear in the moving direction, and the sheet B is thus drawn on the trestle 1 by the movement of the frame 2. Therefore, with the apparatus as shown and described above, the sheet drawing operation of the sheet from the take-up roll can be executed substantially concurrently with the stacking and compressing operations of the sheet. However, this invention is not limited to the concurrent operations of stacking and compressing of the sheet.

Before the frame 2 extends beyond the trestle 1, the sheet stopper 6 holds the sheet A, the sheet cutter 8 cuts the sheet A, and the frame 2 is then stopped at a position extended over the trestle 1.

Figure 7:
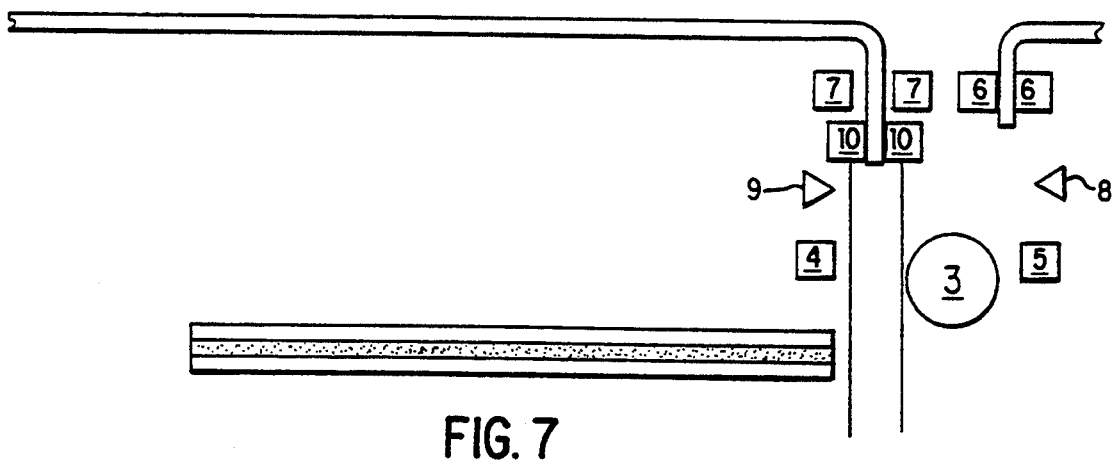
Figure 8:
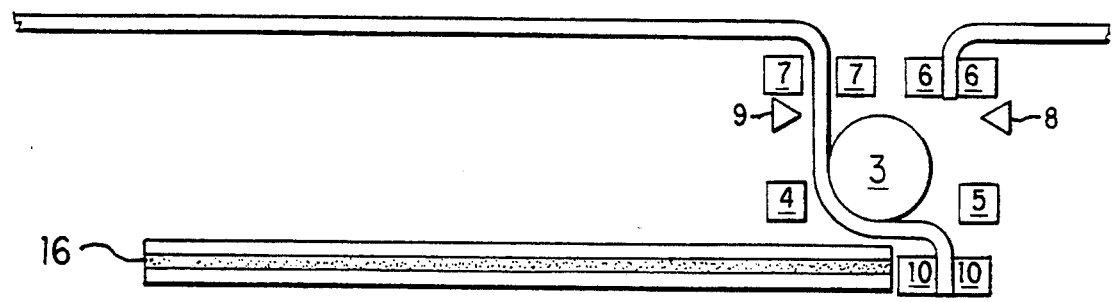

Then, the sheet clipper 10 is raised to grasp the end of the sheet B as shown in FIG. 7. After the sheet stopper 7 is released, the sheet B is moved down to a position shown in FIG. 8.

Figure 9:
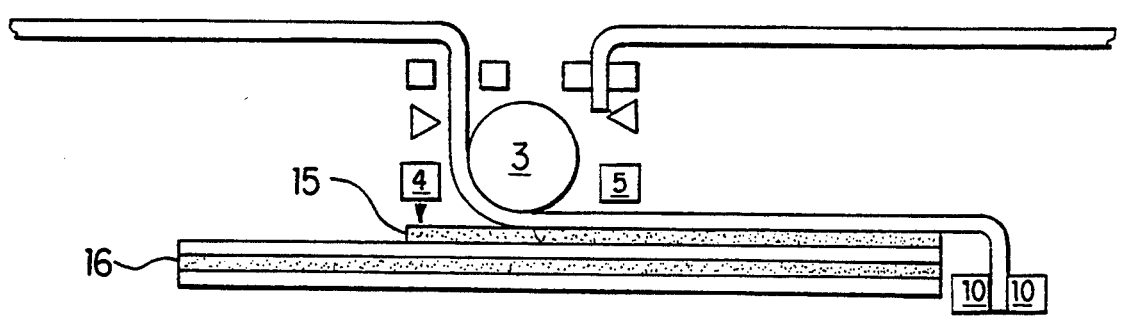

The frame 2 is then moved in a direction of an arrow II in FIG. 1. The surface of the sheet A laminated as described above is coated with a plurality of stripes of adhesive by the adhesive coating unit 4 at the position deviated at ½ of pitch from the adhesive coating unit 5. The sheet B is stacked on the laminated sheet A, compressed by the pressing roll 3, and laminated as shown in FIG. 9. In this case, the sheet A grasped by the sheet stopper 6 is drawn on the trestle 1 similarly to the sheet B as described above.

Figure 10:
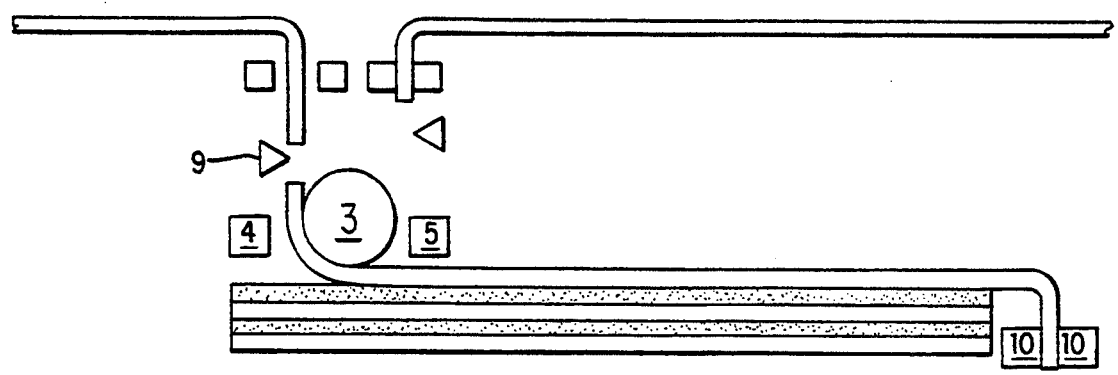

Before the frame 2 exceeds beyond the trestle 1, the sheet B is grasped by the sheet stopper 7, cut by the sheet cutter 9, and the frame 2 is then stopped as shown in FIG. 10.

Figure 11:
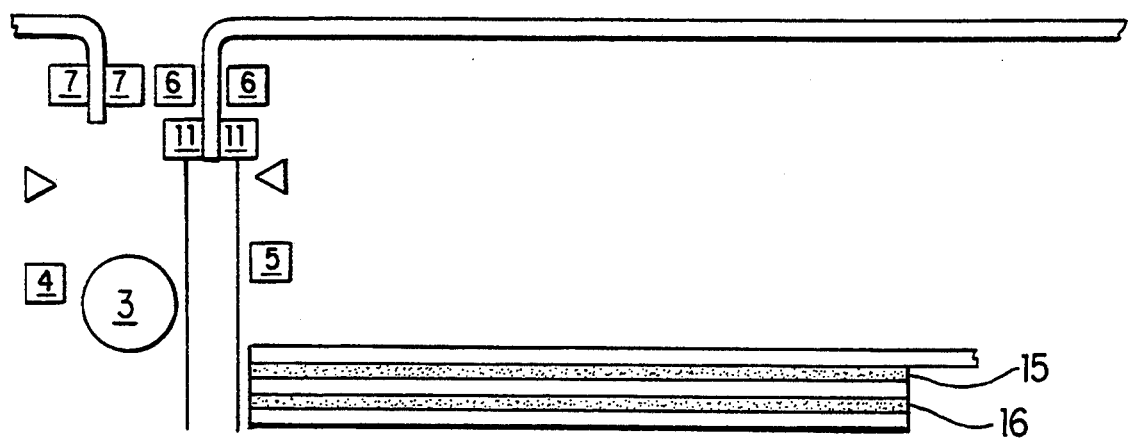
Figure 12:
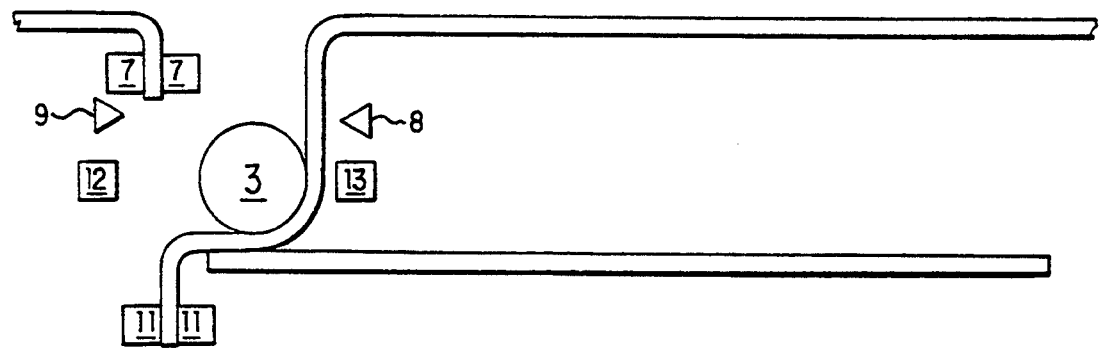
FIGS. 12–19 show the movement of the frame across the trestle during operation of a second embodiment.

Then, as shown in FIG. 11, the sheet clipper 11 mounted at the other side of the trestle 1 is raised to grasp the end of the sheet A. After the sheet stopper 6 is released, the sheet B is moved downwardly.

Then, the frame 2 is moved in a direction of an arrow I similarly to the above operation.

The adhesive coating units 4 and 5 shown in FIG. 1 may be set at the other positions 12 and 13 as indicated by two-dotted broken lines in FIG. 1. In this case, a rear surface of the sheet to be laminated may be coated with the adhesive, and then pressed and laminated to the sheet placed and fixed on the trestle 1. A sheet in which adhesive is easily impregnated may be employed in this apparatus.

Figure 13:
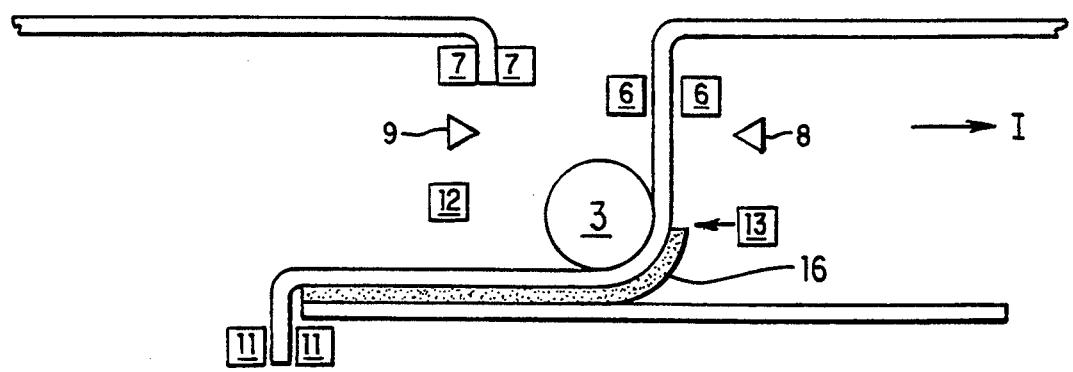
Figure 14:
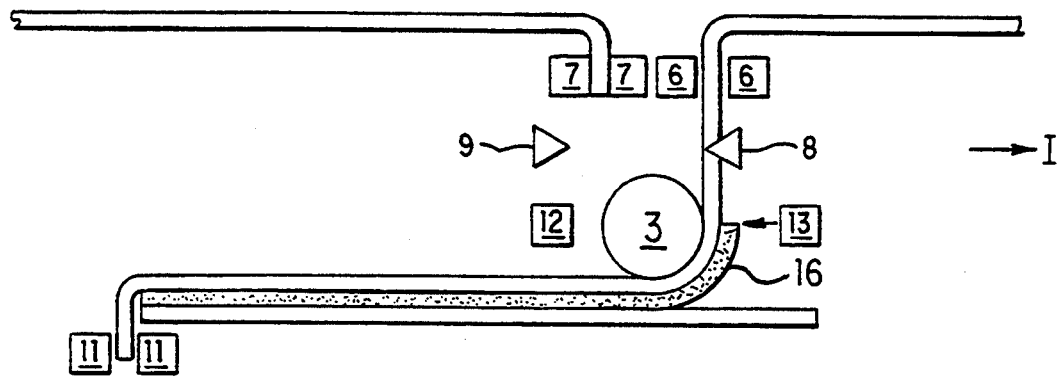
Figure 15:
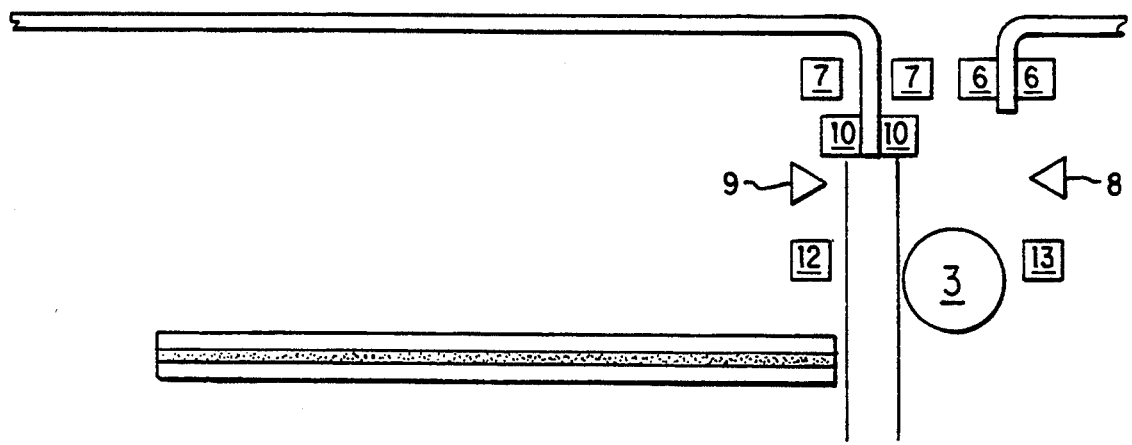
Figure 16:
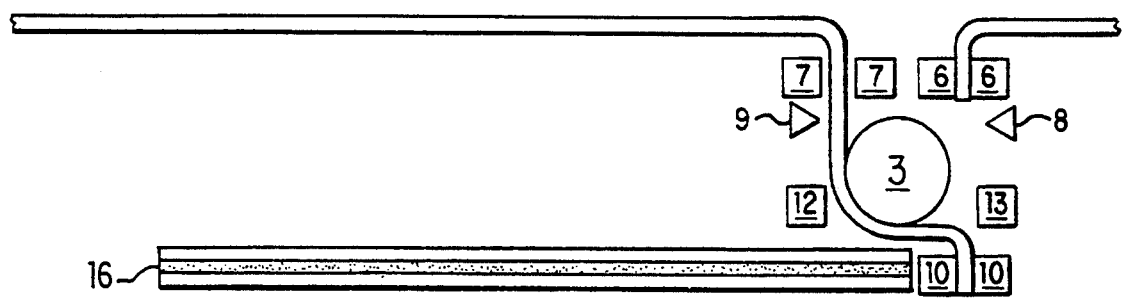
Figure 17:
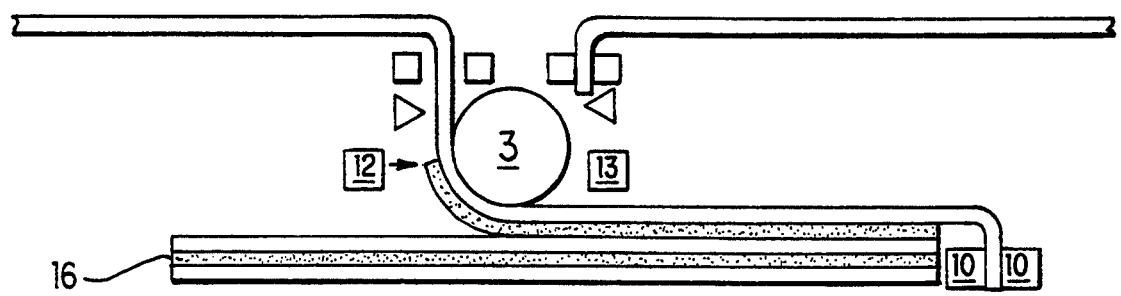
Figure 18:
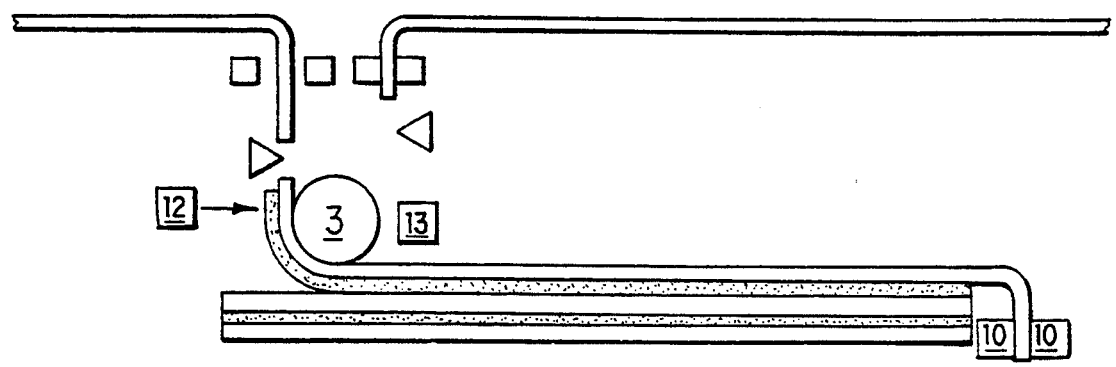
Figure 19:
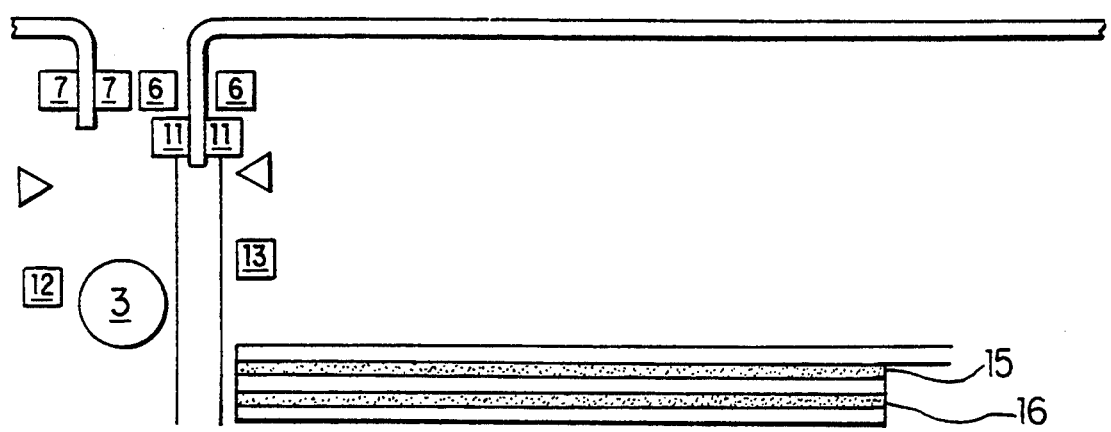

FIGS. 12–19 correspond to FIGS. 4–11. However, FIGS. 12–19 show the adhesive coating units 12 and 13 coating a rear surface of the sheet to be laminated prior to the pressing operation and the lamination operation. In particular, FIG. 13 shows the adhesive coating unit 13 coating a rear surface of the sheet A with an adhesive 16 prior to the sheet A being pressed by the pressing roll 3 onto the sheet B. Additionally, FIG. 17 shows the adhesive coating unit 12 coating the rear surface of the sheet B with the adhesive 15 prior to being pressed onto sheet A.

This invention is not limited to the apparatus shown in FIG. 1, but may employ various apparatus without departing from the spirit and scope of this invention.

The above described operation is sequentially repeated to continuously form a laminate in which the sheets A and sheets B are alternately laminated and adhered.

Figure 2:
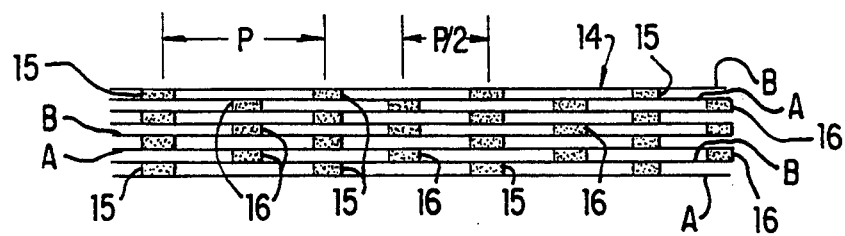
FIG. 2 is an explanatory view of an example of a laminate to be manufactured by this invention.

FIG. 2 shows an example of the laminate obtained by this invention. The sheet B is laminated and adhered onto the sheet A with a plurality of stripes of adhesive layers 15, the sheet A is then laminated and adhered onto the adhered sheet B with a plurality of stripes of the adhesive layer 16 deviated at ½ of pitch of the adhesive layers 15, they are sequentially laminated and adhered repeatedly to form a laminate 14.

Figure 3:
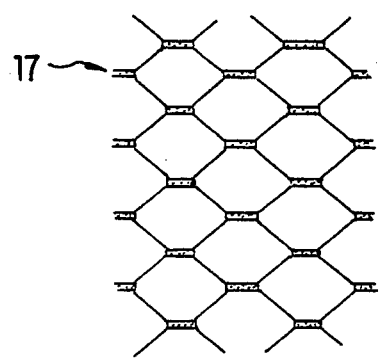
FIG. 3 is an explanatory view of an example of the state that the laminate is elongated.

When the laminate 14 is elongated in the direction of the laminated layer, a honeycomb structure 17 as shown in FIG. 3 is provided.

As shown in FIG. 1, this invention laminates the sheet sequentially placed and fixed on the trestle 1, and laminates the sheet on the sheet placed and fixed on the trestle 1 while coating the sheet with the adhesive by reciprocating the frame 2. Therefore, a plurality of stripes of the adhesive thus coated on the sheet can be accurately linearly coated on the sheet.

Since the adhesive coating unit can coat the sheet with the adhesive from a plurality of slits formed at the shim of the coating head by flowing, the width of one stripe of the adhesive and an interval between the stripes can be formed to be smaller than those of the conventional one, and hence a honeycomb cell structure of much smaller than the conventional one can be simply formed. In addition, a cutter capable of forming slits in the drawing direction of the sheet may be mounted at the frame 2 exemplified in FIG. 1 to simply cut it in the row direction of the honeycomb cells.

According to this invention as described above, the take-up rolls are installed at both sides of the trestle having the flat surface, the sheets are alternately drawn from both sides onto the trestle, coated with the adhesive on the surfaces, the sheets are then pressed and cut. These operations are sequentially repeated to form the laminate for the honeycomb structure. Consequently, the positions of the adhesive layer on the sheet are not deviated, as in the case of the prior art, but the accurate honeycomb structure can be continuously simply manufactured.

Further, when the adhesive coating units as exemplified in FIG. 1 are employed, the adhesive coating units coat the sheet with the adhesive from the slits formed at the shim of the coating head by flowing. Therefore, the width of the stripes of the adhesive and the interval between the stripes of the adhesive can be formed to be smaller than those of the prior art, and the sheet can be coated with the adhesive in the same shape and state. Consequently, according to this invention, an accurate honeycomb structure having a much smaller cell structure may be simply manufactured.

What is claimed is:

1. A method for manufacturing a laminate for a honeycomb structure by longitudinally reciprocating a frame on a trestle between first and second sheet supply rolls located at opposite longitudinal ends of the trestle, the frame moving in a first direction from the first supply roll toward the second supply roll and moving in a second opposite direction from the second supply roll toward the first supply roll, the frame including adhesive coating means and a pressing roll, the method comprising the steps of:

(a) locating a first sheet on a flat surface of the trestle and a second sheet drawn from the second supply roll on the trestle, the first sheet being cut to a predetermined length;
   (b) coating a top surface of the first sheet or a bottom surface of the second sheet with a first plurality of parallel stripes of adhesive using the adhesive coating means by moving the frame in the first direction;
   (c) stacking the second sheet onto the first sheet when the frame is moved in the first direction so that the bottom surface of the second sheet faces the top surface of the first sheet;
   (d) pressing the second sheet onto the first sheet using the pressing roll when the frame is moved in the first direction;
   (e) drawing a third sheet from the first supply roll as the frame is moved in the first direction;
   (f) cutting the second sheet to the predetermined length;
   (g) coating a top surface of the second sheet or a bottom surface of the third sheet with a second plurality of parallel stripes of adhesive using the adhesive coating means by moving the frame in the second direction, wherein the second plurality of parallel stripes is longitudinally offset from the first plurality of parallel stripes;
   (h) stacking the third sheet onto the second sheet when the frame is moved in the second direction so that the bottom surface of the third sheet faces the top surface of the second sheet;
   (i) pressing the third sheet onto the second sheet using the pressing roll as the frame is moved in the second direction;
   (j) drawing a fourth sheet from the second supply roll when the frame is moved in the second direction;
   (k) cutting the third sheet to the predetermined length; and
   (l) sequentially repeating steps (b)–(k) a predetermined number of times.

2. The method of claim 1, wherein the steps of coating the top surface of the first sheet or the bottom surface of the second sheet, stacking the second sheet and pressing the second sheet occur substantially concurrently.

3. The method of claim 1, wherein the steps of coating the top surface of the second sheet or the bottom surface of the third sheet, stacking the third sheet, and pressing the third sheet occur substantially concurrently.

4. The method of claim 1, wherein the adhesive coating means comprises a first adhesive coating unit and a second adhesive coating unit, the first and second coating units being selectively activated based on movement of the frame in the first and second directions.

5. The method of claim 4, wherein the first adhesive unit coats the top surface of the first sheet or the bottom surface of the second sheet when the frame is moved in the first direction, the second adhesive units coats the top surface of the second sheet or the bottom surface of the third sheet when the frame is moved in the second direction.

* * * * *